(12) United States Patent
Ren et al.

(10) Patent No.: US 8,720,189 B2
(45) Date of Patent: May 13, 2014

(54) APPARATUS AND METHOD FOR ONBOARD PERFORMANCE MONITORING OF OXIDATION CATALYST

(75) Inventors: Shouxian Ren, Ypsilanti, MI (US); Scott R. Gordon, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 615 days.

(21) Appl. No.: 13/014,164

(22) Filed: Jan. 26, 2011

(65) Prior Publication Data

US 2012/0186226 A1    Jul. 26, 2012

(51) Int. Cl.
*F01N 3/18* (2006.01)
*F01N 3/36* (2006.01)

(52) U.S. Cl.
USPC .................... 60/286; 60/274; 60/277; 60/301

(58) Field of Classification Search
USPC ................................... 60/277, 286, 301, 274
See application file for complete search history.

(56) References Cited

U.S. PATENT DOCUMENTS

| | | | |
|---|---|---|---|
| 5,592,815 A * | 1/1997 | Jelden et al. ..................... | 60/274 |
| 6,622,548 B1 | 9/2003 | Hernandez | |
| 6,701,707 B1 | 3/2004 | Upadhyay et al. | |
| 6,775,623 B2 | 8/2004 | Ali et al. | |
| 6,882,928 B2 | 4/2005 | Yurgil | |
| 6,899,093 B2 | 5/2005 | Center | |
| 7,051,520 B2 * | 5/2006 | Nagaoka et al. ................ | 60/297 |
| 7,134,273 B2 | 11/2006 | Mazur et al. | |
| 8,464,517 B2 * | 6/2013 | Fujita ............................. | 60/287 |
| 2007/0137183 A1 * | 6/2007 | Kawamura et al. ............. | 60/286 |
| 2009/0155151 A1 * | 6/2009 | Liu et al. ..................... | 423/239.1 |
| 2009/0178393 A1 * | 7/2009 | Norsk et al. .................... | 60/286 |
| 2009/0223207 A1 | 9/2009 | Ren | |

FOREIGN PATENT DOCUMENTS

| | | |
|---|---|---|
| DE | 10133944 A1 | 1/2002 |
| DE | 102009010517 A1 | 8/2010 |
| DE | 102009015592 A1 | 10/2010 |
| DE | 102010015385 A1 | 12/2010 |
| GB | 2470391 A | 11/2010 |
| JP | 2009185659 A * | 8/2009 |

OTHER PUBLICATIONS

Machine Translation of JP 2009185659A.*
Office Action for German Patent Application No. 10 2012 001 251.9 dated Jul. 4, 2013, 7 pages.
OBD II regulation, §1968.2 Malfunction and Diagnostic System REquirements—2004 and Subsequent Model Year Passenger Cars, Light-Duty Trucks, and Medium-Duty Vehicles and Engines. -:-, 2004. S. 63. (1.2.3), (B).—ISBN-. www.oal.ca.gov [abgerufen am Jul. 31, 2012], 2 pages.

* cited by examiner

*Primary Examiner* — Kenneth Bomberg
*Assistant Examiner* — Brandon Lee
(74) *Attorney, Agent, or Firm* — Cantor Colburn LLP

(57) ABSTRACT

A method and system for determining conversion of NO to $NO_2$ in an engine exhaust stream by an oxidation catalyst during operation of the engine is disclosed based on injecting hydrocarbon fuel into the exhaust stream upstream of the oxidation catalyst, measuring a temperature of the exhaust stream on the upstream and downstream sides of the oxidation catalyst, calculating a difference in exhaust stream temperature between the upstream and downstream sides of the oxidation catalyst, and determining the conversion of NO to $NO_2$ by the oxidation catalyst from the difference in exhaust stream temperature based on a predetermined correlation profile between the temperatures on the upstream and downstream sides of the oxidation catalyst and conversion of NO to $NO_2$.

22 Claims, 3 Drawing Sheets

APPARATUS AND METHOD FOR ONBOARD PERFORMANCE MONITORING OF OXIDATION CATALYST

FIELD OF THE INVENTION

Exemplary embodiments of the present invention are related to monitoring engine exhaust systems and, more specifically, to an apparatus and method for determining the NO to NO2 conversion efficiency of an oxidation catalyst (DOC) in the engine exhaust stream.

BACKGROUND

Significant interest has been focused on the reduction of certain constituents in internal combustion engine exhaust. Recently, focus has been placed on diesel engines. Diesel engine exhaust typically contains gaseous emissions such as carbon dioxide ("$CO_2$"), water vapor ("$H_2O$"), unburned hydrocarbons ("HC"), carbon monoxide ("CO"), and oxides of nitrogen ("$NO_x$") including NO and $NO_2$, along with solid and/or liquid condensed phase materials referred to as particulates. Treatment of diesel engine exhaust may involve various catalytic devices having one or more catalysts disposed on a substrate for reducing the levels of regulated constituents in the diesel exhaust. For example, diesel exhaust treatment systems may include an oxidation catalyst, also known as a diesel oxidation catalyst ("DOC"), to convert HC and CO to $CO_2$ and water, a catalyst for the reduction of $NO_x$, and a particulate filter, also known as a diesel particulate filter ("DPF"), for removal of particulates.

One diesel exhaust treatment technology of particular interest is the use of a selective catalytic reduction ("SCR") catalyst for the reduction of $NO_x$. This technology involves the catalytically-enhanced reduction of NO to nitrogen and oxygen by ammonia or an ammonia source such as urea. The efficiency of this reduction reaction is significantly impacted by the ratio of $NO_2:NO_x$ in the exhaust stream entering the SCR reactor. The impact of this ratio on SCR efficiency is especially pronounced at lower operating temperatures (e.g., <300° C.). For a typical zeolite-based SCR catalyst, the desired $NO_2:NO_x$ ratio is about 0.5, which is required for a fast SCR reaction. Exhaust coming out of an engine, however, often exhibits a less than ideal $NO_2:NO_x$ ratio of less than 0.2. Fortunately, a DOC device, which is often placed upstream of an SCR reactor in diesel exhaust treatment systems, is capable of converting NO to $NO_2$ so that the ratio of $NO_2:NO_x$ in the exhaust stream entering the SCR reactor can more closely approach the desired ratio.

One issue, however, with reliance on a DOC device to convert NO to $NO_2$ in order to enhance the $NO:NO_2$ ratio in the exhaust stream entering the SCR device is that the NO to $NO_2$ conversion efficiency of a DOC device can vary with aging and/or operating conditions. It would therefore be desirable to have the capability, on board of a vehicle, to monitor the NO to $NO_2$ conversion efficiency of a DOC exhaust treatment device. Unfortunately, most $NO_x$ sensors are not capable of distinguishing between NO and $NO_2$, so direct on-board measurement of the DOC's NO to $NO_2$ conversion efficiency is not feasible. Accordingly, it is desirable to provide a system and method for measurement of a DOC exhaust treatment device's efficiency of converting NO to $NO_2$.

SUMMARY OF THE INVENTION

In one exemplary embodiment of the present invention, an exhaust treatment system capable of determining conversion of NO to $NO_2$ in an engine exhaust stream by an oxidation catalyst during operation of the diesel engine includes:

an oxidation catalyst disposed in an engine exhaust stream;

a temperature sensor disposed in the exhaust stream upstream of the oxidation catalyst;

a temperature sensor disposed in the exhaust stream downstream of the oxidation catalyst; and a controller comprising a microprocessor in communication with the temperature sensor disposed in the exhaust stream upstream of the oxidation catalyst and with the temperature sensor disposed in the exhaust stream downstream of the oxidation catalyst, and a storage medium including instructions for causing the microprocessor to implement a method comprising injecting hydrocarbon fuel into the exhaust stream upstream of the oxidation catalyst;

measuring a temperature of the exhaust stream on the upstream and downstream sides of the oxidation catalyst;

calculating a difference in exhaust stream temperature between the upstream and downstream sides of the oxidation catalyst; and determining the conversion of NO to $NO_2$ by the oxidation catalyst from the difference in exhaust stream temperature based on a predetermined correlation profile between the temperatures on the upstream and downstream sides of the oxidation catalyst and conversion of NO to $NO_2$.

In another exemplary embodiment of the present invention, a method of determining conversion of NO to $NO_2$ in an engine exhaust stream by an oxidation catalyst during operation of the engine includes the steps of:

injecting hydrocarbon fuel into the exhaust stream upstream of the oxidation catalyst; measuring a temperature of the exhaust stream on the upstream and downstream sides of the oxidation catalyst;

calculating a difference in exhaust stream temperature between the upstream and downstream sides of the oxidation catalyst; and determining the conversion of NO to $NO_2$ by the oxidation catalyst from the difference in exhaust stream temperature based on a predetermined correlation profile between the temperatures on the upstream and downstream sides of the oxidation catalyst and conversion of NO to $NO_2$.

The above features and advantages and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
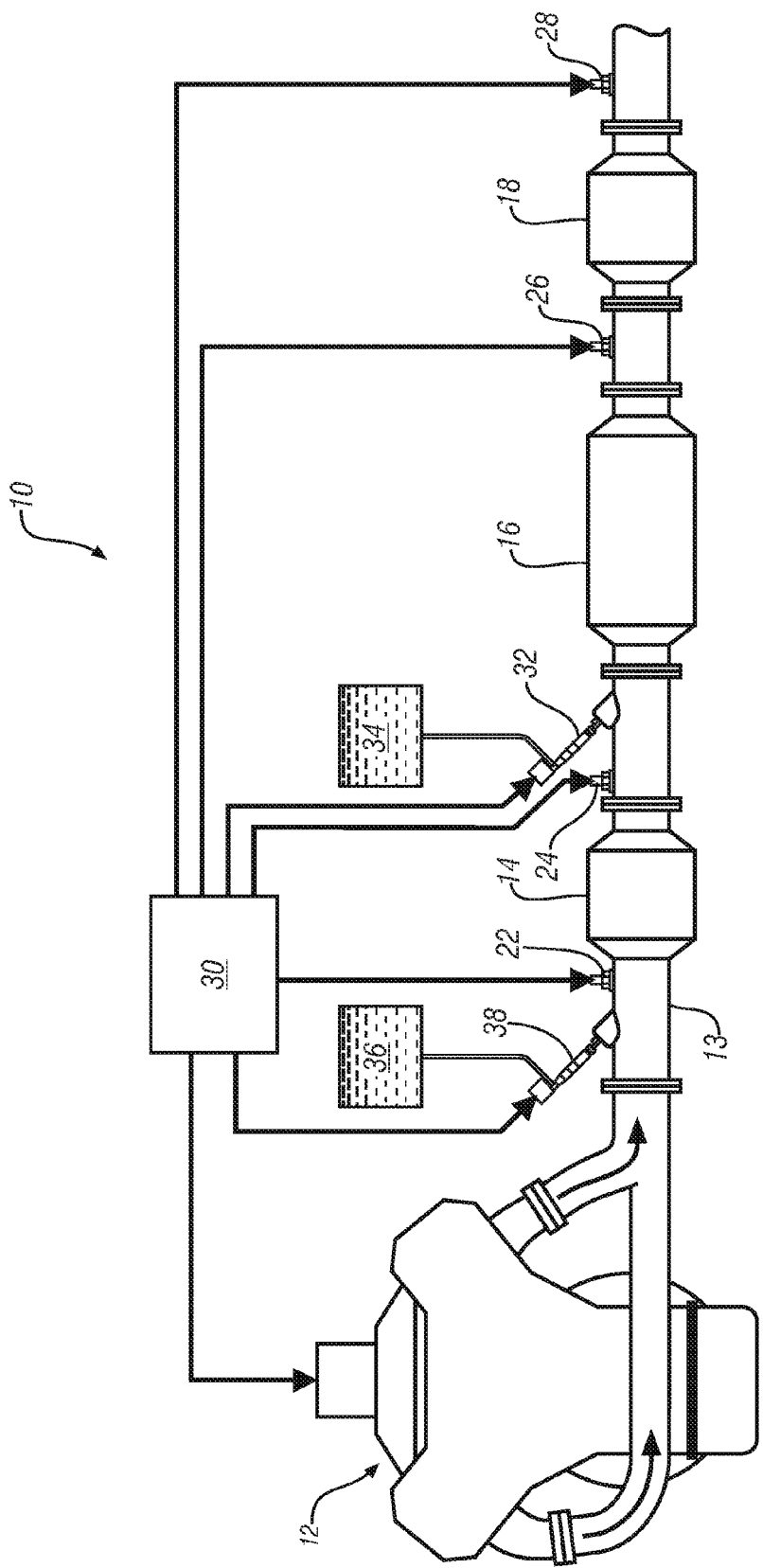
FIG. 1 is schematic view an exhaust treatment system according to exemplary embodiments of the invention.

Referring now to FIG. 1, an exemplary embodiment of the invention is directed to an exhaust treatment system 10 for reduction of regulated components of engine exhaust from an internal combustion engine such as diesel engine 12. The system includes an exhaust conduit 13, which collects exhaust from the diesel engine 12 and transports it to the treatment devices in the system, such as oxidation catalyst 14, SCR catalyst 16, and particulate filter 18. Temperature sensor 22 measures the oxidation catalyst inlet temperature by measuring the temperature of the exhaust stream at the inlet to oxidation catalyst 14. Temperature sensor 24 measures the oxidation catalyst outlet temperature by measuring the temperature of the exhaust stream at the outlet from oxidation catalyst 14. Temperature sensor 26 measures the exhaust stream temperature downstream of the SCR catalyst 16 and temperature sensor 28 measures the exhaust stream temperature downstream of particulate filter 18. Other sensors (not shown), such as additional temperature sensors, oxygen sensors, ammonia sensors, and the like may be incorporated at various positions in the exhaust treatment system as is known in the art.

Fuel source 36 is connected to fuel injector 38 for injecting fuel into the engine exhaust stream upstream of oxidation catalyst 14. In this exemplary embodiment, fuel injector 38 is shown as positioned in the exhaust stream downstream of engine 12, which conceptually represents the injection of fuel into the exhaust stream, also known as "post injection". In other exemplary embodiments as commonly practiced in the art, post injection can be carried out with fuel injectors that inject fuel into the engine cylinders for combustion by modifying the timing of the fuel injection to inject fuel into the engine cylinders during their exhaust stroke, thus eliminating the need for a separate downstream fuel injector 38.

Reductant source 34 is connected to reductant injector 32 for injecting reductant into the engine exhaust stream upstream of SCR catalyst 16 to enhance the effectiveness of the SCR catalyst at reducing $NO_x$ emissions. The reductant may include any known reducing agent, such as ammonia or urea. Urea is commonly used as a reducing agent used for motor vehicle exhaust SCR treatment schemes, and is also referred to as Diesel Exhaust Fluid (DEF) by the US EPA.

Control module 30 receives inputs from temperature sensors 22, 24, 26, and 28 and communicates output settings to fuel injector 38 and reductant injector 32. Control module 30 also receives input data and communicates output settings to various components in engine 12, as well as other sensors and devices in other on-board vehicle systems. Control module 30 may be any known type of control module, such as a microprocessor coupled with a storage medium containing data and instructions for controlling system 10 and carrying out methods according to exemplary embodiments of the invention, or other equivalent art known electronic control unit.

In accordance with exemplary embodiments of the invention, control module 30 diagnoses NO to $NO_2$ conversion efficiency of the oxidation catalyst 14, which can in turn provide useful information regarding the efficiency of the SCR in reducing $NO_x$ emissions and can control engine operating parameters for effective exhaust warm-up and optimization of urea solution (DEF) dosing rate accordingly. In so doing, control module 30 relies on a relationship between the temperature differential from the inlet to the outlet of the oxidation catalyst during periods of high-temperature operation. Such high temperature operation of the oxidation catalyst can occur during post injection of fuel into the exhaust stream, such as during a regeneration cycle for the particulate filter.

Figure 2A:
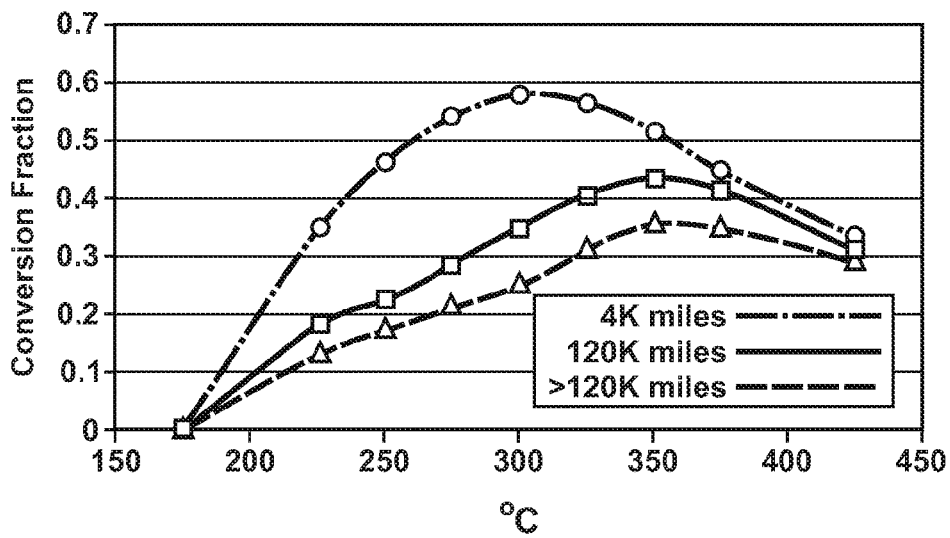
FIG. 2A is a graph depicting percent NO to $NO_2$ conversion in an oxidation catalyst as a function of operating temperature difference between the inlet and outlet temperatures of the oxidation catalyst.
Figure 2B:
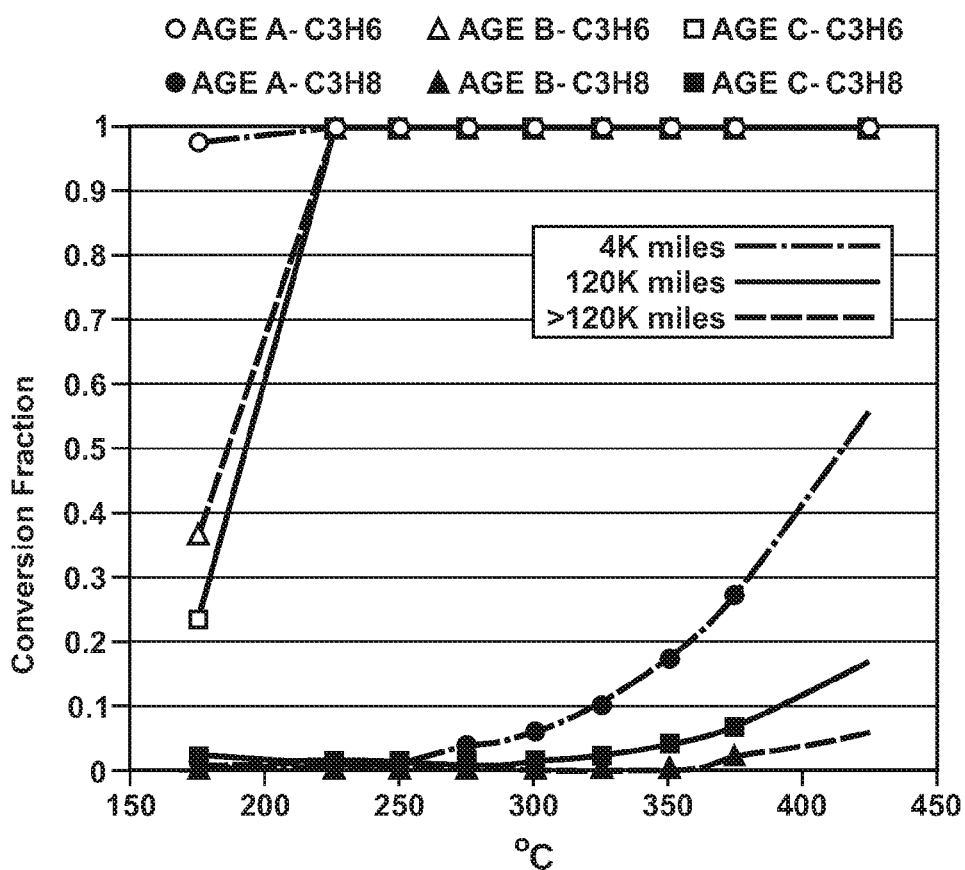
FIG. 2B is a graph depicting hydrocarbon conversion in an oxidation catalyst as a function of operating temperature difference between the inlet and outlet temperatures of the oxidation catalyst.

An estimated relationship between oxidation catalyst inlet/outlet temperature differential ($\Delta T$) may be seen by reference to FIGS. 2A and 2B, which plots NO to $NO_2$ conversion and hydrocarbon conversion as a function of outlet temperature for an oxidation catalyst that has been subject to simulated accelerated aging by oxidizing a hydrocarbon-containing feed stream to model 4000 (4K) miles of regeneration cycling, 120,000 (120K) miles of regeneration cycling, and threshold aging (identified as >120K miles in FIGS. 2A and 2B) where the catalyst has been subjected to simulated aging sufficient to cause it to fail to meet performance specifications. It should be noted that for a relatively constant inlet temperature, the outlet temperature will be inversely related to the $\Delta T$ (e.g., higher outlet temperatures mean a smaller $\Delta T$, and lower outlet temperatures mean a larger $\Delta T$). FIG. 2A illustrates NO to $NO_2$ conversion efficiency as a function of outlet temperature (and thus as a function of $\Delta T$) at the different simulated aging levels, thus impacting the $NO_2:NO_x$ ratio. FIG. 2B illustrates hydrocarbon conversion as a function of outlet temperature at the different simulated aging levels, and shows that for a given amount of hydrocarbon conversion, $\Delta T$ will drop with aging, thus impacting the overall levels of $NO_2$ and $NO_x$ in the exhaust stream. Of course, the actual relationship between inlet/outlet temperature differential during operation of a particular engine and exhaust system would be dependent on the specific design and operating parameters of the particular engine and oxidation catalyst, but it could be readily determined and converted to a predictive model based on experimental data obtained on an engine/exhaust system.

Figure 3:
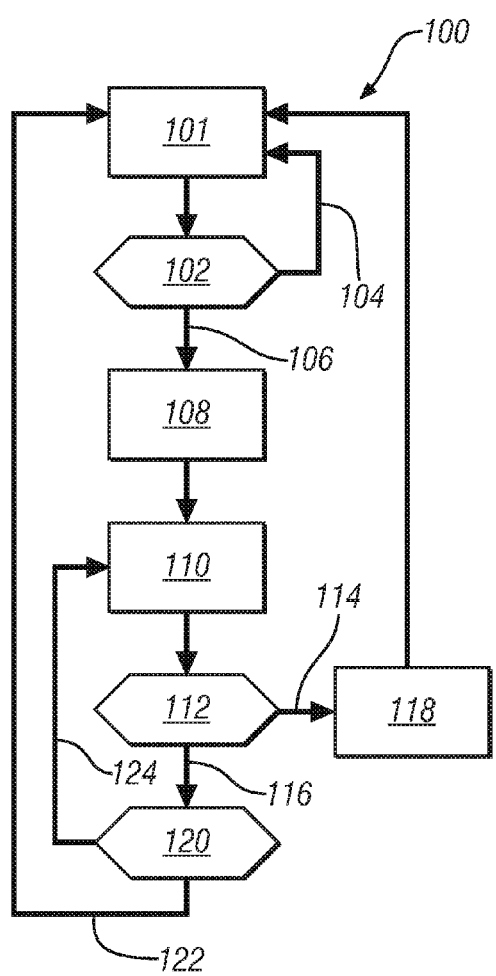
FIG. 3 is a block diagram representing a method of determining NO to $NO_2$ conversion in an oxidation catalyst according to exemplary embodiments of the invention.

Turning now to FIG. 3, a flow chart 100 illustrating portions of a control algorithm in accordance with an exemplary embodiment of the invention is illustrated for performing diagnostics to determine NO to $NO_2$ conversion efficiency of an oxidation catalyst. In this exemplary embodiment, control algorithm 100 is implemented as the result of an electronic control module ("ECM") initiated diagnostic during operation of a vehicle, in which case the algorithm at step 101 checks whether conditions exist to cause initiation of the diagnostic routine to determine NO to $NO_2$ conversion efficiency of the oxidation catalyst. Such conditions can vary depending on the particular design and operating parameters of the engine and its exhaust system and may include, for example, the passage of accumulated time of engine operation, suitable DOC inlet temperatures, anomalous sensor readings such as an unexpected concentration of ammonia in the exhaust stream downstream of the SCR catalyst, or other factors as would be recognized by one skilled in the art.

The algorithm logic path then moves to decision node 102 where the algorithm assesses whether conditions for proceeding with the diagnostic are satisfied. If the conditions are not satisfied, the logic path loops along path 104 back to box 101. If the conditions are satisfied, the logic path proceeds along path 106 to box 108, which provides for the commencement of post fuel injection, and also starts a timer and/or a fuel flow monitor.

From box 108, the logic path proceeds to box 110, which provides for monitoring the thermal response profile of the oxidation catalyst (i.e., inlet and outlet temperatures), along with any other data needed for determination of the NO to $NO_2$ conversion efficiency of the oxidation catalyst, including but not limited to aging information on the catalyst (e.g., cumulative hours of operation and/or cumulative hours of operation during post injection), exhaust flow rate, and post injection fuel quantity.

From box 110, the logic path proceeds to decision node 112, which queries whether sufficient time has passed and/or post injection fuel delivery has occurred since the timer and/or fuel delivery monitor was started in box 108 to meet a predetermined threshold level to model the NO to $NO_2$ conversion efficiency of the oxidation catalyst. If the threshold level(s) have been met, the logic path follows path 114 to box 118, where the modeling of NO to $NO_2$ conversion efficiency of the oxidation catalyst is performed. As discussed above, this modeling is based on the change in temperature across the oxidation catalyst, but how the change in temperature is converted into conversion efficiency may depend on other factors, including but not limited to the age of the catalyst, exhaust flow rate, post fuel injection quantity or flow rate, oxidation catalyst inlet temperature, and/or oxidation catalyst outlet temperature. The conversion may be performed by reference by the microprocessor to a data map, which may consist of multiple sets of lookup tables of temperature change versus conversion efficiency, with the selection of which lookup table to use being based on one or more of the above-referenced data sets (e.g., catalyst age, etc.). After performance and reporting to system control of the NO to $NO_2$ conversion efficiency of the oxidation catalyst, the logic path loops back to box 101 to await the next diagnostic initiation.

If the threshold levels of time has and/or post injection fuel delivery in decision node 112 have not been met, the logic path follows path 116 to decision node 120, where the controller checks whether a system override command has been received to terminate the NO2 conversion diagnostic. Such system override termination commands can be based on a number of factors, such as the vehicle exceeding a predetermined limit of engine idling while the vehicle is not moving, which could expose the external environment adjacent to the exhaust system components to undesired high temperatures. If no system override termination command has been received, the logic path loops back along path 124 to box 110 for continued monitoring of the oxidation catalyst thermal response profile. If a system override termination command has been received, the fuel post injection is terminated along with the diagnostic routine and the logic path loops back along path 122 to box 101 to wait for the next diagnostic initiation.

Figure 4:
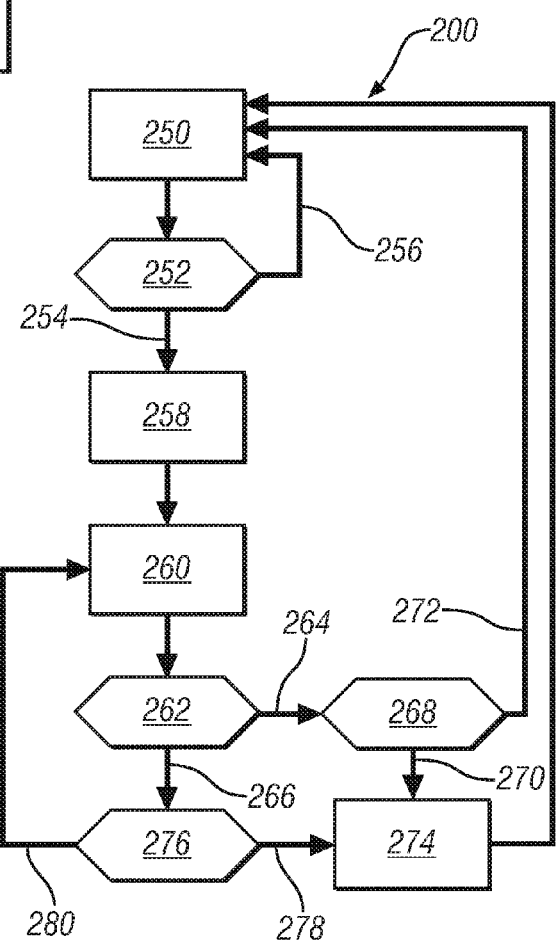
FIG. 4 is a block diagram representing a method of determining NO to $NO_2$ conversion in an oxidation catalyst coincident with a particulate filter (DPF) regeneration according to exemplary embodiments of the invention.

In one exemplary embodiment of the invention, the initiation of the NO to $NO_2$ conversion efficiency diagnostic may coincide with a particulate filter (DPF) regeneration cycle, which also uses post fuel injection to increase exhaust temperatures. Turning now to FIG. 4, a flow chart 200 illustrating portions of a control algorithm in accordance with an exemplary embodiment of the invention is illustrated for performing diagnostics to determine NO to $NO_2$ conversion efficiency of an oxidation catalyst in conjunction with a particulate filter regeneration cycle. In this exemplary embodiment, control algorithm 200 is implemented as the result of an electronic control module ("ECM") initiated particulate filter regeneration during operation of a vehicle, in which case the algorithm at step 250 checks whether conditions exist to cause initiation of a particulate filter regeneration. Such conditions can vary depending on the particular design and operating parameters of the engine and its exhaust system and may include, for example, the passage of period of accumulated time of engine operation, anomalous sensor readings such the temperature or exhaust flow downstream of the particulate filter, or other factors as would be recognized by one skilled in the art.

The algorithm logic path then moves to decision node 252 where the algorithm assesses whether conditions for proceeding with the diagnostic are satisfied. If the conditions are not satisfied, the logic path loops along path 256 back to box 250. If the conditions are satisfied, the logic path proceeds along path 254 to box 258, which provides for the commencement of fuel post injection, and also starts a timer and/or a fuel flow monitor.

From box 258, the logic path proceeds to box 260, which provides for monitoring the thermal response profile of the oxidation catalyst (i.e., inlet and outlet temperatures), along with any other data needed for determination of the NO to $NO_2$ conversion efficiency of the oxidation catalyst, including but not limited to aging information on the catalyst (e.g., cumulative hours of operation and/or cumulative hours of operation during post injection), exhaust flow rate, and post injection fuel quantity.

From box 260, the logic path proceeds to decision node 262, which queries whether a system override command has been received to terminate the particulate filter regeneration cycle. Such system override termination commands can be based on a number of factors, such as the vehicle exceeding a predetermined limit of engine idling while the vehicle is not moving, which could expose the external environment adjacent to the exhaust system components to undesired high temperatures.

If a system override termination command has been received, the fuel post injection is terminated along with the diagnostic routine and the logic path proceeds along path 264 to decision node 268 where the controller queries whether sufficient time has and/or post fuel injection delivery has occurred since the timer and/or fuel delivery monitor was started in box 258 to meet a predetermined threshold level to model the NO to $NO_2$ conversion efficiency of the oxidation catalyst. If a system override termination command has not been received, fuel post injection is maintained and the logic path proceeds along path 266 to decision node 276 where the controller queries whether sufficient time has and/or post fuel injection delivery has occurred since the timer and/or fuel delivery monitor was started in box 258 to meet a predetermined threshold level to model the NO to $NO_2$ conversion efficiency of the oxidation catalyst.

If the threshold level(s) in decision node 268 have not been met, the logic path loops back along path 272 to box 250 to await the next initiation of a particulate filter regeneration cycle. If the threshold levels in decision node 276 have not been met, the logic path loops back along path 280 to continue monitoring of the oxidation catalyst thermal response profile.

If the threshold level(s) have been met in either of decision nodes 268 or 276, the logic path follows path 270 or path 278 to box 274, where the modeling of NO to $NO_2$ conversion efficiency of the oxidation catalyst is performed. As discussed above, this modeling is based on the change in temperature across the oxidation catalyst, but how the change in temperature is converted into conversion efficiency may depend on other factors, including but not limited to the age of the catalyst, exhaust flow rate, post injection fuel quantity or flow rate, oxidation catalyst inlet temperature, and/or oxidation catalyst outlet temperature. The conversion may be performed by reference of the microprocessor to a data map, which may consist of multiple sets of lookup tables of temperature change versus conversion efficiency, with the selection of which lookup table to use being based on one or more of the above-referenced data sets (e.g., catalyst age, etc.).

After performance and reporting to system control of the NO to NO₂ conversion efficiency of the oxidation catalyst, the logic path loops back to box 250 to await initiation of the next particulate filter regeneration.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. An engine exhaust treatment system fluidly coupled to an internal combustion engine, comprising:
    an oxidation catalyst disposed in an engine exhaust stream;
    a hydrocarbon injector disposed upstream of the oxidation catalyst;
    a temperature sensor disposed in the exhaust stream upstream of the oxidation catalyst;
    a temperature sensor disposed in the exhaust stream downstream of the oxidation catalyst; and
    an electronic control unit in communication with the temperature sensor disposed in the exhaust stream upstream of the oxidation catalyst, with the temperature sensor disposed in the exhaust stream downstream of the oxidation catalyst, and with the hydrocarbon injector, the electronic control unit configured to:
        inject hydrocarbon fuel into the exhaust stream upstream of the oxidation catalyst; measure a temperature of the exhaust stream on the upstream and downstream sides of the oxidation catalyst during a predetermined period of time following the injection of hydrocarbon fuel into the exhaust stream;
        calculate a difference in exhaust stream temperature between the upstream and downstream sides of the oxidation catalyst; and
        determine a value for conversion of NO to NO2 by the oxidation catalyst from the difference in exhaust stream temperature based on a predetermined correlation profile between the temperatures on the upstream and downstream sides of the oxidation catalyst and conversion of NO to NO2.

2. The system of claim 1, wherein the electronic control unit is configured to determine the conversion of NO to NO2 by the oxidation catalyst by comparing the temperatures on the upstream and downstream sides of the oxidation catalyst to a stored map of exhaust stream temperature values on the upstream and downstream sides of the oxidation catalyst and NO to NO2 conversion values.

3. The system of claim 1, wherein the electronic control unit is configured to determine the conversion of NO to NO2 by the oxidation catalyst by calculating NO to NO2 conversion values based on a stored mathematical relationship between exhaust stream temperature values on the upstream and downstream sides of the oxidation catalyst.

4. The system of claim 1, wherein the predetermined correlation profile between the temperatures on the upstream and downstream sides of the oxidation catalyst and conversion of NO to NO₂ is a predetermined correlation profile based on one or more factors including the difference in temperatures between the upstream and downstream sides of the oxidation catalyst.

5. The system of claim 4, wherein the storage medium further comprises a map of exhaust stream temperature values on the upstream and downstream sides of the oxidation catalyst and NO to NO₂ conversion values.

6. The system of claim 4, wherein the electronic control unit is configured to determine the conversion of NO to NO2 by the oxidation catalyst by calculating NO to NO2 conversion values based on a stored mathematical relationship between exhaust stream temperature values on the upstream and downstream sides of the oxidation catalyst.

7. The system of claim 1, wherein the predetermined correlation profile is based on factors including the temperatures on the upstream and downstream sides of the oxidation catalyst and the age of the oxidation catalyst.

8. The system of claim 1, further comprising a reductant source, an SCR catalyst, and a particulate filter disposed downstream of the oxidation catalyst.

9. The system of claim 1, wherein the hydrocarbon injector is disposed in fluid communication with the exhaust stream downstream of the engine and upstream of the oxidation catalyst.

10. The system of claim 1, wherein the internal combustion includes a combustion cylinder having said hydrocarbon injector disposed therein, and the electronic control unit is further configured to modify timing of the fuel injection to inject fuel into the combustion cylinder during a combustion cylinder exhaust stroke in addition to injecting fuel into the cylinder for combustion.

11. A method of determining conversion of NO to NO₂ in an internal combustion engine exhaust stream treated by an oxidation catalyst during operation of the engine, comprising:
    injecting hydrocarbon fuel into the exhaust stream upstream of the oxidation catalyst;
    measuring a temperature of the exhaust stream on the upstream and downstream sides of the oxidation catalyst during a predetermined period of time following the injection of hydrocarbon fuel into the exhaust stream;
    calculating a difference in exhaust stream temperature between the upstream and downstream sides of the oxidation catalyst; and
    determining a value for conversion of NO to NO₂ by the oxidation catalyst from the difference in exhaust stream temperature based on a predetermined correlation profile between the temperatures on the upstream and downstream sides of the oxidation catalyst and conversion of NO to NO₂.

12. The method of claim 11, wherein the step of determining the conversion of NO to NO₂ by the oxidation catalyst includes determining NO to NO₂ conversion values based on a map of exhaust stream temperature values on the upstream and downstream sides of the oxidation catalyst and NO to NO₂ conversion values.

13. The method of claim 11, wherein step of determining the conversion of NO to NO₂ by the oxidation catalyst includes calculating NO to NO₂ conversion values based on a mathematical relationship between exhaust stream temperature values on the upstream and downstream sides of the oxidation catalyst.

14. The method of claim 11, wherein the predetermined correlation profile between the temperatures on the upstream and downstream sides of the oxidation catalyst and conversion of NO to NO₂ is a predetermined correlation profile based on one or more factors including the difference in temperatures between the upstream and downstream sides of the oxidation catalyst.

15. The method of claim 14, wherein the step of determining the conversion of NO to $NO_2$ by the oxidation catalyst includes determining NO to $NO_2$ conversion values based on a map of exhaust stream temperature values on the upstream and downstream sides of the oxidation catalyst and NO to $NO_2$ conversion values.

16. The method of claim 14, wherein step of determining the conversion of NO to $NO_2$ by the oxidation catalyst includes determining NO to $NO_2$ conversion values based on a mathematical relationship between exhaust stream temperature values on the upstream and downstream sides of the oxidation catalyst.

17. The method of claim 11, wherein the predetermined correlation profile is based on factors including the temperatures on the upstream and downstream sides of the oxidation catalyst and the age of the oxidation catalyst.

18. The method of claim 11, further comprising treating the exhaust stream with an SCR catalyst and reductant source, and a particulate filter located downstream of the oxidation catalyst.

19. The method of claim 11, wherein the hydrocarbon fuel is injected into the exhaust stream by a hydrocarbon fuel injector disposed in fluid communication with the exhaust stream downstream of the engine and upstream of the oxidation catalyst.

20. The method of claim 11, wherein the internal combustion engine includes a combustion cylinder, and the hydrocarbon fuel is injected into the exhaust stream by a hydrocarbon fuel injector disposed in said combustion cylinder, the method further comprising modifying timing of the fuel injection to inject fuel into a combustion cylinder during a combustion cylinder exhaust stroke in addition to injecting fuel into the cylinder for combustion.

21. The system of claim 8, wherein the electronic control unit is configured to perform the steps of claim 1 during a regeneration cycle of the particulate filter.

22. The method of claim 18, wherein the steps of claim 11 are performed during a regeneration cycle of the particulate filter.

* * * * *